(12) United States Patent
Yoon (10) Patent No.: US 11,640,427 B2
(45) Date of Patent: May 2, 2023

(54) METHOD AND SYSTEM FOR RECOMMENDING VIDEO

(71) Applicant: Jong Sik Yoon, Busan (KR)

(72) Inventor: Jong Sik Yoon, Busan (KR)

(73) Assignee: DATAEDU Inc., Busan (KR)

( * ) Notice: Subject to any disclaimer, the term of this patent is extended or adjusted under 35 U.S.C. 154(b) by 286 days.

(21) Appl. No.: 17/207,714

(22) Filed: Mar. 21, 2021

(65) Prior Publication Data

US 2021/0294847 A1    Sep. 23, 2021

(30) Foreign Application Priority Data

Mar. 23, 2020   (KR) .................. 10-2020-0034965

(51) Int. Cl.

| | |
|---|---|
| *G10L 15/26* | (2006.01) |
| *G06F 16/783* | (2019.01) |
| *G06F 40/35* | (2020.01) |
| *H04N 21/25* | (2011.01) |
| *G06Q 30/0601* | (2023.01) |
| *G06F 16/738* | (2019.01) |
| *G06N 7/01* | (2023.01) |

(52) U.S. Cl.
CPC ........ *G06F 16/7844* (2019.01); *G06F 16/738* (2019.01); *G06F 40/35* (2020.01); *G06N 7/01* (2023.01); *G06Q 30/0627* (2013.01); *G10L 15/26* (2013.01); *H04N 21/251* (2013.01)

(58) Field of Classification Search
None
See application file for complete search history.

(56) References Cited

U.S. PATENT DOCUMENTS

| | | | | |
|---|---|---|---|---|
| 8,874,590 | B2* | 10/2014 | Suzuki ................ | G10L 15/1822 707/750 |
| 9,197,736 | B2* | 11/2015 | Davis .................. | G06F 3/04842 |
| 10,095,686 | B2* | 10/2018 | Zhang .................... | G06Q 50/10 |
| 10,924,808 | B2* | 2/2021 | Qi ..................... | H04N 21/44218 |
| 11,023,523 | B2* | 6/2021 | Hauptmann .......... | G06F 16/738 |

(Continued)

FOREIGN PATENT DOCUMENTS

| | | |
|---|---|---|
| KR | 1020130022942 A | 3/2013 |
| KR | 101617649 B1 | 5/2016 |

*Primary Examiner* — Neeraj Sharma
(74) *Attorney, Agent, or Firm* — Snell & Wilmer L.L.P.

(57) ABSTRACT

Disclosed is a method for recommending a video by a video recommendation system, comprising: collecting and storing in a database of the video recommendation system videos related to products being sold and video information of the videos; converting voice included in each of the videos to text; obtaining words from the converted text and a time stamp for each of the words; extracting noun keywords in the text and identifying frequencies of the noun keywords, by analyzing morphemes of the text; performing a sentiment analysis on sentences composed of the words in the text; receiving a selection of one of the products; identifying videos associated with the selected product from among the videos stored in the database based on the noun keywords and the frequencies of the noun keywords; providing videos according to a predetermined criterion among the identified videos, based on a result of the sentiment analysis; and if one of the provided videos is selected, providing a partial video in a time section associated with the selected product.

20 Claims, 7 Drawing Sheets

(56) References Cited

U.S. PATENT DOCUMENTS

| | | | | |
|---|---|---|---|---|
| 2006/0085735 | A1* | 4/2006 | Shimizu | G06F 40/169 |
| | | | | 715/201 |
| 2009/0207247 | A1* | 8/2009 | Zampieron | G08B 13/19669 |
| | | | | 704/E15.001 |
| 2018/0373547 | A1* | 12/2018 | Dawes | H04N 21/4788 |
| 2020/0195983 | A1* | 6/2020 | Chao | G06F 16/7328 |
| 2020/0206631 | A1* | 7/2020 | Sumant | G06V 40/20 |
| 2020/0310842 | A1* | 10/2020 | Yen | G06F 9/453 |
| 2021/0125389 | A1* | 4/2021 | Tommy | G06F 40/30 |
| 2021/0136448 | A1* | 5/2021 | Ramirez | G10L 15/26 |

* cited by examiner

METHOD AND SYSTEM FOR RECOMMENDING VIDEO

CROSS-REFERENCE TO RELATED APPLICATIONS

This application claims priority to Korean Patent Application No. 10-2020-0034965 filed Mar. 23, 2020, the disclosure of which is hereby incorporated by reference in its entirety.

TECHNICAL FIELD

The present disclosure generally relates to video recommendation, more particularly to a method and system for recommending videos by analyzing voice included in videos.

BACKGROUND

In providing sales services or the like, there is increasing customer demand for accessing product information in advance to make a reasonable decision on product purchase. Likewise, there is also increasing business operators' demand for providing product information while promoting and recommending products more easily. Various technologies are being developed to meet the demands of both parties, and in particular, technology for selecting and recommending videos suitable for product recommendation is being studied. The video recommendation technology may be required to more accurately determine the relevance between a video and a product and the sentiment about a product in a video and to allow consumers to obtain information on a product more easily.

Patent Document 1 discloses a method for selecting a recommended video by considering evaluations by users who actually watched the video and preferences of users to watch the video. In addition, Patent Document 2 discloses recognizing at least one of user's facial expression and biometric information when a video is being played to determine whether the user is interested in each scene of the video, thereby extracting, from the video, a playback time on a scene of interest of the user.

PRIOR ART DOCUMENTS (PATENT DOCUMENT 1) Korean Patent No. 10-1305535 (Sep. 2, 2013)
(PATENT DOCUMENT 2) Korean Patent No. 10-1617649 (Apr. 27, 2016)

Problem to be Solved

However, Patent Document 1 is not based on the content of a video itself, which causes a problem that it is difficult to provide a user who wants to purchase a product with information on the product.

Also, Patent Document 2 does not extract a portion of a video showing information on a product from the video itself, but merely extracts a section that is determined to be a scene of interest by learning reactions of the user watching the video, which causes a problem that it is difficult for a consumer to easily obtain information on a product from the video.

Means for Solving the Problem

A method for recommending a video by a video recommendation system according to some examples of the present disclosure comprises: by a video collection unit of the video recommendation system, collecting and storing in a database of the video recommendation system videos related to products being sold and video information of the videos, wherein the videos related to the products being sold and the video information of the videos are collected based on at least one of a product name or a name representing one or more characteristics of products; by a video data manipulation unit of the video recommendation system, converting voice included in each of the videos to text; by the video data manipulation unit, obtaining words from the converted text and a time stamp for each of the words; by the video data manipulation unit, extracting noun keywords in the text and identifying frequencies of the noun keywords, by analyzing morphemes of the text; by the video data manipulation unit, performing a sentiment analysis on sentences composed of the words in the text; by a video recommendation unit of the video recommendation system, receiving a selection of one of the products; by the video recommendation unit, identifying videos associated with the selected product from among the videos stored in the database based on the noun keywords and the frequencies of the noun keywords; by the video recommendation unit, providing videos according to a predetermined criterion among the identified videos, based on a result of the sentiment analysis; and if one of the provided videos is selected, by the video recommendation unit, providing a partial video in a time section associated with the selected product.

A system for recommending a video according to some examples of the present disclosure comprises: a video collection unit; a video data manipulation unit; a video recommendation unit; and a database storing data processed by the video collection unit and the video data manipulation unit, wherein the video collection unit collects and stores in the database videos related to products being sold and video information of the videos, wherein the videos related to the products being sold and the video information of the videos are collected based on at least one of a product name or a name representing one or more characteristics of products; wherein the video data manipulation unit converts voice included in each of the videos to text, obtains words from the converted text and a time stamp for each of the words, extracts noun keywords in the text and identifies frequencies of the noun keywords, by analyzing morphemes of the text, and performs a sentiment analysis on sentences composed of the words in the text, and wherein the video recommendation unit receives a selection of one of the products, identifies videos associated with the selected product from among the videos stored in the database based on the noun keywords and the frequencies of the noun keywords, provides videos according to a predetermined criterion among the identified videos, based on a result of the sentiment analysis, and if one of the provided videos is selected, provides a partial video in a time section associated with the selected product.

Effect of the Invention

The method and system for recommending a video according to the present disclosure convert, in a process of recommending a video, voice data of a video to text and analyze sentiment of each sentence of the text, which allows more accurately determining the sentiment of the video about a product and utilizing the video for advertisement and promotion of the product.

The method and system for recommending a video according to the present disclosure derive, in a process of recommending a video, a time when a particular product or a characteristic of a product is mentioned in a selected video to provide a video in a manner that it can be played from the time, which allows more conveniently identifying a portion of the video related to the product and the characteristic of a product.

The method and system for recommending a video according to the present disclosure categorize, in a process of recommending a video, sentiment about a product and a characteristic of a product in a section of a video in which the product and the characteristic of a product are mentioned, which allows consumers to identify information on a product or service more promptly and make a decision.

DETAILED DESCRIPTION

Hereinafter, examples of the present disclosure are described in detail with reference to the drawings. The description below is only for specifying examples, and is not intended to limit or restrict the scope of the present disclosure. What a person having ordinary skills in the technical field of the present disclosure can easily infer from the detailed description and examples of the present disclosure should be construed as belonging to the scope of the present disclosure.

The terms used in the present disclosure are ordinary terms widely used in the technical field of the present disclosure, but the definitions of the terms used in the present disclosure may vary depending on the intention of a skilled person in the pertinent technical field, precedents, or introduction of new technology. Some terms may be arbitrarily selected by the applicant, in which case the definitions of the terms will be described in detail. Terms used in the present disclosure should be construed to have not only a dictionary definition but also a definition according to the overall context of the specification.

Terms such as 'comprise' or 'include' used in the present disclosure should not be construed as necessarily including all of the constituents or steps described in the specification, and the terms should be construed to be intended to indicate cases where some of the constituents or steps are not included and cases where additional constituents or steps are further included.

Terms including an ordinal number such as 'first' or 'second' used in the present disclosure may be used to describe various constituents or steps, but the constituents or steps should not be limited by the ordinal numbers. A term used with an ordinal number should be construed such that the term is used for the sole purpose of distinguish one constituent or step from other constituents or steps.

In the examples of the present disclosure described below, a hardware approach is described as an example. However, since the examples of the present disclosure include technology using both hardware and software, the examples of the present disclosure do not exclude a software-based approach.

Hereinafter, the present disclosure relates to a method and system for recommending a video. Specifically, the present disclosure describes technology for providing particular information in videos suitable for a selected product by recognizing and analyzing voice of videos related to products.

Terms that refer to systems, terms that refer to objects in a system, terms that refer to modules in an object, terms that refer to constituents of a device, terms that refer to data stored in an object, etc. used in the following description are examples provided for convenience of description. Accordingly, the present disclosure is not limited to the terms stated below, and other terms having an equivalent technical meaning may be used.

In particular, throughout the present disclosure, the term 'partial video' may be defined as a video set to be played from the start of a section in which a product name or one or more characteristics of a product is mentioned, or a video set to be played at a predetermined earlier time than the start of a section in which a product name or one or more characteristics of a product is mentioned. That is, the term 'partial video' is intended to indicate a video where a playable section is at least part of the entire playback section by starting a playback of the video from at an intermediate point, not the start of the entire playback section of the video.

Hereinafter, examples according to the present disclosure are described in detail with reference to the drawings. Detailed descriptions of matters widely known to persons skilled in the technical field of the present disclosure are omitted.

Figure 1:
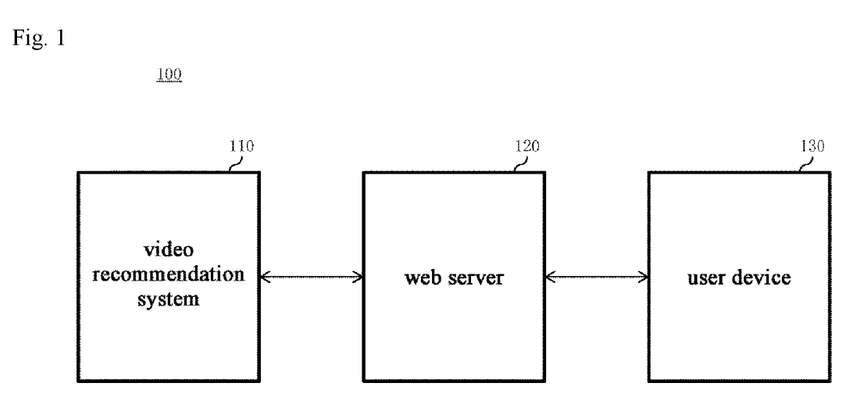
FIG. 1 illustrates a service provision system according to some examples.

FIG. 1 illustrates a service provision system 100 according to some examples. The service provision system 100 of FIG. 1 comprises a video recommendation system 110, a web server 120, and a user device 130.

The service provision system 100 may mean a comprehensive system for providing a particular service to a user of the user device 130. For example, the service may mean a general service that can be considered for the sale of a product, such as providing information about products being sold via a web page and processing a product purchased by a consumer to be shipped.

The video recommendation system 110 is a system for recommending videos to the user device 130. The video recommendation system 110 may store videos about products registered for sale or the like in the service provision system 100 and an analysis result for each video, and provide videos related to a product selected by the user device 130. For example, the video recommendation system 110 may, by identifying a product mentioned in each video and evaluation of the product based on voice data included in the videos, provide videos suitable for a product searched and selected by the user device 130 and further provide a portion of a selected video in which the product is mentioned. For the purpose of performing the function, the video recommendation system 110 may comprise an object or a plurality of objects with separate functions.

The web server 120, which is a server for providing the web to a user, may provide a web page via a network when a service is requested by the user device 130. For example, the web server 120 may provide the user device 130 with a web page showing a product list including information such as images of products being sold, product names, and prices. In addition, if a search for a particular product is requested by the user device 130, the web server 120 may provide the user device 130 with a web page showing a search result. Also, if a particular product is selected by the user device 130, the web server 120 may provide the user device 130 with a web page comprising videos related to the particular product provided from the video recommendation system 110. In addition, if a particular video is selected by the user device 130, the web server 120 may provide the user device 130 with a web page showing a portion in which the particular product is mentioned of the particular video provided from the video recommendation system 110. As stated above, the web server 120 may provide the user device 130 with various forms of video recommendation services in a web page format provided by the video recommendation system 110.

The user device 130, which is a device used by a user, may be one of a variety of devices that may be provided with services provided by the service provision system 100 via the web server 120. For example, a user device 130 may be one of a variety of computing devices such as a personal computer (PC), a smartphone, a tablet PC and other mobile devices. The user device 130 may be provided with a video recommendation service provided by the video recommendation system 110, which is described in detailed below, via the web server 120.

Figure 2:
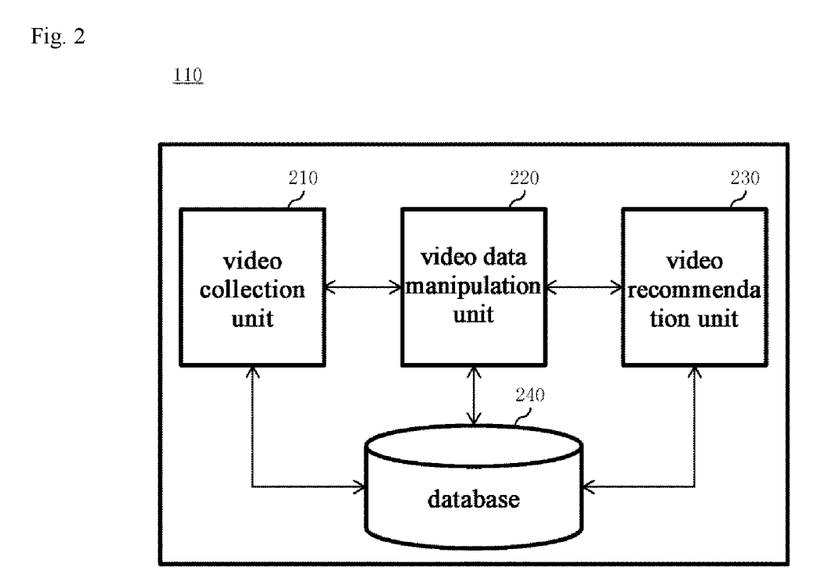
FIG. 2 illustrates the constitution of a video recommendation system according to some examples.

FIG. 2 illustrates the constitution of a video recommendation system according to some examples. The constitution illustrated in FIG. 2 may be understood as the constitution of the video recommendation system 110. The terms such as 'unit' and '-er' mean a unit processing at least one function or operation and may be implemented by hardware, software, or a combination of hardware and software.

Referring to FIG. 2, the video recommendation system 110 comprises a video collection unit 210, a video data manipulation unit 220, a video recommendation unit 230, and a database 240.

The video collection unit 210 may collect and store in the database 240 videos related to products being sold by the service provision system 100 and video information of the videos. Specifically, the video collection unit 210 may collect videos related to products being sold and video information of the videos based on at least one of a product name or a name representing one or more characteristics of products. For example, when a service about health supplement food sales is provided, the video collection unit 210 may collect videos based on at least one of the product name of each of the health supplement foods being sold or the name of the main ingredient contained in each of the health supplement foods. In addition, the video collection unit 210 may take account of relevant videos that were recently uploaded to the Internet by re-collecting and storing videos and video information of the videos at a predetermined cycle.

The video collection unit 210 may collect and store various pieces of video information related to videos. For example, the video collection unit 210 may store the pieces of information shown in Table 1 below in the database 240 together with videos.

TABLE 1

| Video information | Content of information |
|---|---|
| name | video title |
| views | number of video views |
| upload date | video upload date |
| good | number of likes |
| hate | number of dislikes |
| subscriber | number of subscribers |
| URL | video address |
| comment | comments |

As shown in Table 1, the video collection unit 210 may collect and store video information containing at least one of, for each video, the video title, the numbers of video views, the video upload date, indications of preferences for the video (e.g., the number of likes or dislikes), the numbers of subscribers to the channel where the video was uploaded, the video address, or the comments on the video in the database 240 together with the videos. In addition, the video collection unit 210 may store various pieces of additional information in addition to the video information described in Table 1.

The video data manipulation unit 220 may convert voice included in each of the videos to text. Converting voice to text by the video data manipulation unit 220 may comprise converting the voice to the text based on STT (speech-to-text).

The video data manipulation unit 220 may obtain words from the converted text and a time stamp for each of the words. Specifically, obtaining time stamps by the video data manipulation unit 220 may comprise identifying words included in the text based on the duration of the voice, and outputting the identified words and a time stamp for each of the words together.

Time stamps obtained for text may comprise values indicating the start time and duration of each word. In addition, the time stamps may comprise accuracy which numerically indicates whether each of the words included in the text was accurately identified. Table 2 below shows examples of a time stamp for each word for some contents of a video.

TABLE 2

| Start time [s] | Duration [s] | Keyword | Accuracy |
|---|---|---|---|
| 6.39 | 0.51 | nutrition supplement | 1.00 |
| 6.90 | 0.15 | for | 1.00 |
| 7.05 | 0.30 | first | 0.90 |
| 7.35 | 0.42 | intake | 0.46 |
| 7.77 | 0.57 | persons | 0.98 |
| 8.37 | 0.54 | nutrition supplement | 0.60 |
| 8.91 | 0.06 | of | 0.75 |
| 8.97 | 0.39 | basic | 0.82 |
| 9.36 | 0.42 | is | 0.93 |
| 10.08 | 1.17 | multivitamins | 0.94 |
| 11.37 | 0.54 | vitamin | 1.00 |
| 11.91 | 0.36 | D | 0.67 |
| 12.30 | 0.27 | and | 1.00 |
| 12.57 | 0.33 | omega | 1.00 |
| 12.90 | 0.39 | 3 | 1.00 |

As shown in Table 2, the video data manipulation unit 220 may, based on intervals between sections where voice is present, durations thereof, etc., identify text corresponding to voice of each section and calculate accuracy of the identified text. In this case, the accuracy may be expressed as a value indicating a possibility between 0 and 1.

Converting voice included in a video to text may be performed based on a deep learning training model. In addition, the deep learning training model may comprise at least one of an acoustic model or a language model. That is, the video data manipulation unit 220 may convert voice included in a video based on STT which underwent pre-learning based on a deep learning training model.

The video data manipulation unit 220 may extract noun keywords in the text and identify frequencies of the noun keywords, by analyzing morphemes of the text. More specifically, extracting noun keywords in the text and identifying frequencies of the noun keywords by the video data manipulation unit 220 may comprise identifying whether the extracted noun keywords are the same and counting the extracted noun keywords, thereby identifying frequencies of the noun keywords. In addition, the noun keywords extracted by the video data manipulation unit 220 may comprise at least one of a product name or a name representing one or more characteristics of products.

The morpheme analysis for the text may be performed using a morpheme analyzer which underwent pre-learning based on deep learning. In this case, a pre-processed morpheme analyzer may be used in order to extract noun keywords related to a service being provided by the service provision system 100. For example, when a service about health supplement food sales is provided, time stamps for each word as in Table 2 above can be obtained. Here, according to a result of STT, 'vitamin' and 'D' may be recognized as separate words, and 'omega' and '3' may be recognized as separate words as well. In some examples of the present disclosure, a morpheme analyzer may be pre-processed by collecting information on the health supplement food being sold, in order to extract 'vitamin' and 'D,' which are recognized as separate words, as 'vitamin D' and 'omega' and '3' as 'omega 3.' By pre-processing a morpheme analyzer and having it undergo pre-learning in this manner, the video data manipulation unit 220 may extract noun keywords such as 'nutrition supplement,' 'first,' 'person,' 'basic,' 'multivitamins,' 'vitamin D,' and 'omega 3' as in Table 2 through morpheme analysis.

The video data manipulation unit 220 may identify frequencies of the extracted noun keywords and store them in the database 240. Table 3 below shows noun keywords arranged based on their frequencies.

TABLE 3

| Noun keywords | Frequency |
| --- | --- |
| vitamin | 28 |
| product | 27 |
| level | 26 |
| content | 18 |
| one | 14 |
| high content | 12 |
| capsule | 11 |
| form | 11 |
| selenium | 11 |
| description | 10 |
| folic acid | 10 |

For example, when a service about health supplement food sales is provided, the video data manipulation unit 220 may extract noun keywords from text obtained by performing STT for a video, and arrange the noun keywords based on the number of their extractions. Referring to Table 3, 'vitamin,' 'product,' 'level,' and 'content' may be extracted 28, 27, 26 and 18 times respectively, with the other keywords extracted less than them, before being arranged and stored in the database 240. The video data manipulation unit 220 may use the stored noun keywords and their frequencies to determine suitability of the video when providing the video.

The video data manipulation unit 220 may perform a sentiment analysis on sentences composed of the words in the text. Specifically, performing a sentiment analysis by the video data manipulation unit 220 may comprise calculating a prediction value for sentiment for each sentence and reliability for the prediction value based on a pre-configured sentiment lexicon. In addition, the video data manipulation unit 220 may store the calculated prediction value for sentiment for each sentence and the reliability for the prediction value in the database 240 and use them later to determine the level of provision of a service. The prediction value for sentiment may be one of a first value indicating positive sentiment and a second value indicating negative sentiment. In this case, the first value and the second value may be set to be different from each other. For example, the first value may be set to 1 and the second value to 0, but this is only an example, and the first value and the second value may be set to various values. In addition, reliability of each prediction value may have a value between 0 and 100 in percentage. A numerical expression in percentage is only an example, and the reliability may be expressed various formats. Additionally, the prediction value for sentiment may comprise a third value for the case that sentiment cannot be determined, and the third value may be set to be different from the first value and the second value. For example, the first value indicating positive sentiment may be set to 1, the second value indicating negative sentiment to 0, and the third value indicating undetermined sentiment to 2, but this is only an example, and the first value, the second value, and the third value may be set to various values.

The sentiment lexicon used to perform the sentiment analysis may be updated at a predetermined cycle. With continual update of the sentiment lexicon to add new words such as exclamations and evaluation words for sentiment expression to the sentiment lexicon, accuracy of the sentiment lexicon may be maintained. In some examples, various cycles at which the sentiment lexicon is updated may be determined.

The sentiment analysis performed by the video data manipulation unit 220 may be performed using a sentiment model which pre-learned the sentiment lexicon based on deep learning. The sentiment model may be configured based on an n-gram or Naive Bayesian categorization model. That is, the sentiment model may be configured by applying an n-gram or Naive Bayesian categorization model to various data collected in advance. In addition, the video data manipulation unit 220 may have the sentiment model pre-learn after data on sentiment analysis results are collected, thereby configuring the sentiment model in a format suitable for a service being provided. For examples, when a service about health supplement food sales is provided, the video data manipulation unit 220 may improve the sentiment model to a format suitable for reviewing health supplement foods through re-learning so that the sentiment model can more accurately reflect evaluation of a product mentioned in a video. The data about results of sentiment analysis performed by the video data manipulation unit 220, i.e., each sentence and the prediction value and reliability for each sentence, may be stored in the database 240 together with data about results of the morpheme analysis mentioned above to be used for provision of a video later.

The video recommendation unit 230 may receive a selection of one of the products. The selection of one of the products may be transmitted from the user device 130.

Specifically, for the purpose of allowing at least one of the registered products on a web page provided by the web server 120 to be searched, a search keyword that is at least one of at least part of a product name associated with at least one of the products or a name representing characteristics of the products may be input to the user device 130. The user device 130 may receive an input selecting one of the products searched by the input search keyword, and the selection of one of the products may be forwarded to the video recommendation unit 230 via the web server 120. For example, when a service about health supplement food sales is provided, the user device 130 may be provided, via the web server 120, with a web page on which health supplement foods are being sold. In this case, among the health supplement foods displayed on the web page, the products that the user wants or the products having the main ingredient that that the user wants may be searched by a search keyword, and one of the searched products may be selected by the user device 130.

The video recommendation unit 230 may identify videos associated with a selected product among the videos stored in the database 240 based on the noun keywords and the frequencies of the noun keywords. More specifically, identifying videos associated with a selected product among the videos stored in the database by the video recommendation unit 230 may comprise identifying at least one noun keyword corresponding to the selected product, and determining, among the videos from which at least one noun keyword was extracted, videos where a frequency of the at least one noun keyword satisfies a predetermined criterion.

The video recommendation unit 230 may identify at least one noun keyword corresponding to the selected product. Specifically, when the product is selected, the video recommendation unit 230 may determine whether there is a noun keyword associated with the product among the noun keywords stored in the database 240. That is, the video recommendation unit 230 may identify a noun keyword corresponding to at least one of the product name of the selected product or at least one characteristic of the selected product among the noun keywords extracted from text by the video data manipulation unit 220 and stored in the database 240 as stated above. In this case, the video recommendation unit 230 may identify the main ingredient associated with the selected product based on the relationship between the product name and the at least one characteristic of the product stored in the database 240 in the process of extracting noun keywords of a video as stated above.

The video recommendation unit 230 may determine, among the videos from which at least one noun keyword was extracted, videos where frequency of the at least one noun keyword satisfies a predetermined criterion. Specifically, after identifying a noun keyword corresponding to the selected product as stated above, the video recommendation unit 230 may identify, among the stored videos, videos where the noun keyword was extracted from the text. In addition, the video recommendation unit 230 may determine, among the identified videos, videos where frequency of the extractions of the noun keyword satisfies a predetermined criterion. That is, the video recommendation unit 230 may determine videos from which a noun keyword corresponding to the selected product was extracted at a frequency greater than a predetermined frequency. For example, when a service about health supplement food sales is provided, the video recommendation unit 230 may identify a noun keyword corresponding to the product name or the main ingredient of the health supplement food selected by the user device 130, and identify, among the videos stored in the database 240, videos from which a noun keyword corresponding to the product name or the main ingredient of the health supplement food was extracted N time or more.

The video recommendation unit 230 may provide videos according to a predetermined criterion among the identified videos, based on a result of the sentiment analysis. More specifically, providing, by the video recommendation unit 230, videos according to a predetermined criterion among the identified videos, based on a result of the sentiment analysis may comprise identifying, for the identified videos, a prediction value for sentiment for each sentence and reliability for the prediction value, and providing videos which satisfy the predetermined criterion among the identified videos according to priority based on the prediction value and the reliability for the prediction value.

The video recommendation unit 230 may identify, for the identified videos, a prediction value for sentiment for each sentence and reliability for the prediction value. Specifically, for the videos where frequency of a noun keyword satisfies a predetermined criterion as stated above, the video recommendation unit 230 may identify a result of sentiment analysis for each of the videos. Accordingly, by identifying data about results of sentiment analysis stored in the database 240, the video recommendation unit 230 may identify the sentiment of the video for a product or at least one characteristic of the product identified by a noun keyword. For example, when a service about health supplement food sales is provided, the video recommendation unit 230 may identify whether a video has positive or negative sentiment for a searched health supplement food by identifying a result of sentiment analysis on the video, i.e., its prediction values and reliability thereof.

The video recommendation unit 230 may provide videos which satisfy the predetermined criterion among the identified videos according to priority based on the prediction value and the reliability for the prediction value. Specifically, the video recommendation unit 230 may identify a result of sentiment analysis on the videos where frequency of a noun keyword satisfies a predetermined criterion as stated above, and determine videos to be provided based on a prediction value for each sentence and reliability for the prediction value. In this case, the videos to be provided may be determined by prioritizing positive sentiment or negative sentiment depending on business operator' intentions. In addition, the predetermined criterion may include a variety of criteria such as the one that the number of sentences having a prediction value for particular sentiment is at a predetermined value or higher, the one that the reliability is at a predetermined value or higher, and the one that a calculated average of prediction values for sentences is at a predetermined value or higher. Accordingly, the video recommendation unit 230 may provide videos satisfying a predetermined level in an order according to the level of sentiment for the product in order to keep the number of videos to be provided at the level desired by a business operator.

The videos provided by the video recommendation unit 230 may be visually displayed in an order according to the priority. Specifically, the videos provided may be displayed by the web server 120 in a screen together with information on sales of a selected product. For example, when a service about health supplement food sales is provided, videos associated with the selected product may be provided as in FIGS. 5 and 6 described below.

If one of the provided videos is selected, the video recommendation unit 230 may provide a partial video of a time section associated with the selected product. Providing, by the video recommendation unit 230, a partial video in a time section associated with the selected product may comprise identifying a time stamp of a noun keyword corresponding to the selected product based on a result of the STT for the selected video, and providing the partial video whose playback is set to start at a predetermined earlier time than the start time of the playback section corresponding to the time stamp, the start time of playback of the partial video, and a text including the noun keyword.

The video recommendation unit 230 may identify a time stamp of a noun keyword corresponding to the selected product based on a result of the STT for the selected video. More specifically, the video recommendation unit 230 may identify a time stamp indicating a section of the video in which the noun keyword corresponding to the selected product was extracted. With the time stamp, the start time of a sentence including the noun keyword or a playback section of a portion in which the noun keyword is mentioned may be extracted. The start time of a sentence or the playback section extracted in this manner may be used to provide the partial video.

The video recommendation unit 230 may provide the partial video whose playback is set to start at a predetermined earlier time than the start time of the playback section corresponding to the time stamp, the start time of playback of the partial video, and text including the noun keyword. More specifically, the video recommendation unit 230 may identify the start time of a playback section in which a sentence including the noun keyword is mentioned, and set the selected video to start at a predetermined earlier time than the identified start time. The video whose playback is set to start at an intermediate point of the entire video as described above may be referred to as a partial video. A predetermined time is for convenience of the user watching the video and may be set to 0 or a predetermined value. That is, if the predetermined time is 0, a partial video may be played from the start time of a sentence including the noun keyword and, if the predetermined time is not 0, a partial video may be played before the start time of a sentence including the noun keyword. The video recommendation unit 230 may provide the web server 120 with a partial video for which the start time of playback has been set as described above. Additionally, the video recommendation unit 230 may provide the web server 120 with information on the text of the sentence in which the noun keyword is mentioned, and the start time of the playback of the partial video or of the sentence in which the noun keyword is mentioned. For example, when a service about health supplement food sales is provided, a partial video of a selected video and information on the partial video may be displayed as in FIG. 7 described below.

The database 240 may store all data processed and analyzed by the video collection unit 210 and the video data manipulation unit 220 as described above. In the database 240, data may be stored in a form where the data are associated with each other. To this end, the data may be stored in the form of table or the like but are not limited thereto; they may be stored in other various forms. Tables stored in the database 240 may include at least one of, for example, a table related to product components, a table related to product names, a table for connecting product names and product characteristics, a table for matching product names or product characteristics to videos, a table for storing basic results of STT for videos, a table for storing general deep learning results among STT results, a table for storing frequencies of noun keywords, a table for storing results of deep learning for noun keywords among STT results, a table for storing time stamps according to STT, a table for storing comments on videos, and a table for storing video information obtained by video collection. The video recommendation unit 230 may extract and use necessary information by identifying data stored in the database 240 as described above in order to determine a video to be recommended.

Figure 3:
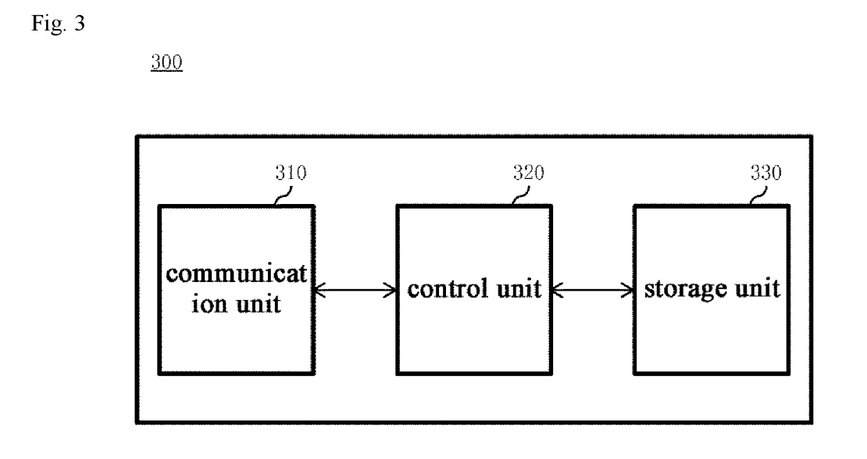
FIG. 3 illustrates the constitution of an electronic device according to some examples.

FIG. 3 illustrates the constitution of an electronic device according to some examples. The terms such as 'unit' and '-er' means a unit, a part, or a component processing at least one function or operation and may be implemented by hardware, software, or a combination of hardware and software.

Referring to FIG. 3, the electronic device comprises a communication unit 310, a control unit 320, and a storage unit 230.

The communication unit 310 may perform functions for transmitting and receiving information. Specifically, the communication unit 310 may provide an interface for performing communication with other devices in the system. That is, the communication unit 310 converts a bit stream transmitted to another device into a physical signal, and converts a physical signal received from another device into a bit stream. The communication unit 310 may perform functions for transmitting and receiving signals in a wireless or wired communication environment. For example, the communication unit 310 may perform a conversion between a baseband signal and a bit stream according to physical layer standards of the system. Also, the communication unit 310 may include a plurality of transmission and reception paths.

The communication unit 310 transmits and receives signals as described above. Accordingly, the communication unit 310 may be referred to as a 'transmitter,' a 'receiver,' or 'transceiver.' In addition, in the following description, transmission and reception are used in a sense to mean the processing performed by the communication unit 310 as described above.

The control unit 320 controls the overall operations of the electronic device 300. For example, the control unit 320 transmits and receives signals via the communication unit 310. In addition, the control unit 320 writes and reads data in the storage unit 330. To this end, the control unit 320 may be implemented as an array of a plurality of logic gates or a general-purpose microprocessor. The control unit 320 may be configured as at least one processor. The control unit 320 may be configured integrally with the storage unit 330 which stores a program or the like, not as a feature separate from the storage unit 330. The control unit 320 may be at least one of a central processing unit (CPU), a graphics processing unit (GPU), or an application processor (AP) provided in the electronic device 300, but they are no more than examples, and the control unit 320 may also be implemented in various other forms.

The storage unit 330 stores data such as a basic program, an application program, and setting information for operation of the electronic device 300. The storage unit 330 may be configured as a volatile memory, a nonvolatile memory, or a combination of a volatile memory and a nonvolatile memory. In addition, the storage unit 330 provides stored data according to a request of the control unit 320.

The constitution of FIG. 3 described above may be understood as the constitution of one or more devices constituting the video recommendation system 110, the web server 120, or the user device 130 according to the examples in the present disclosure.

When the constitution illustrated in FIG. 3 may be understood as the constitution of each of the one or more devices constituting the video recommendation system 110, the video collection unit 210, the video data manipulation unit 220, the video recommendation unit 230, and the database 240 may be implemented by the one or more devices. For example, electronic devices having the constitution of FIG. 3 may perform functions of the video collection unit 210, the video data manipulation unit 220, and the video recommendation unit 230, respectively. Or, a first electronic device may perform a function of a functional unit of one of the video collection unit 210, the video data manipulation unit 220, and the video recommendation unit 230, and a second electronic device may perform functions of the other two functional units. Or, one electronic device may perform all functions of the video collection unit 210, the video data manipulation unit 220, and the video recommendation unit 230. Additionally, the database 240 may be implemented as an entity separate from one or more electronic devices that perform the functions of the video collection unit 210, the video data manipulation unit 220, and the video recommendation unit 230, or implemented in the one or more electronic devices. When the video recommendation system 110 shown in FIG. 2 is configured by two or more devices, the devices may transmit and receive various pieces of information described in the present disclosure through the communication unit 310 of each device.

Figure 4:
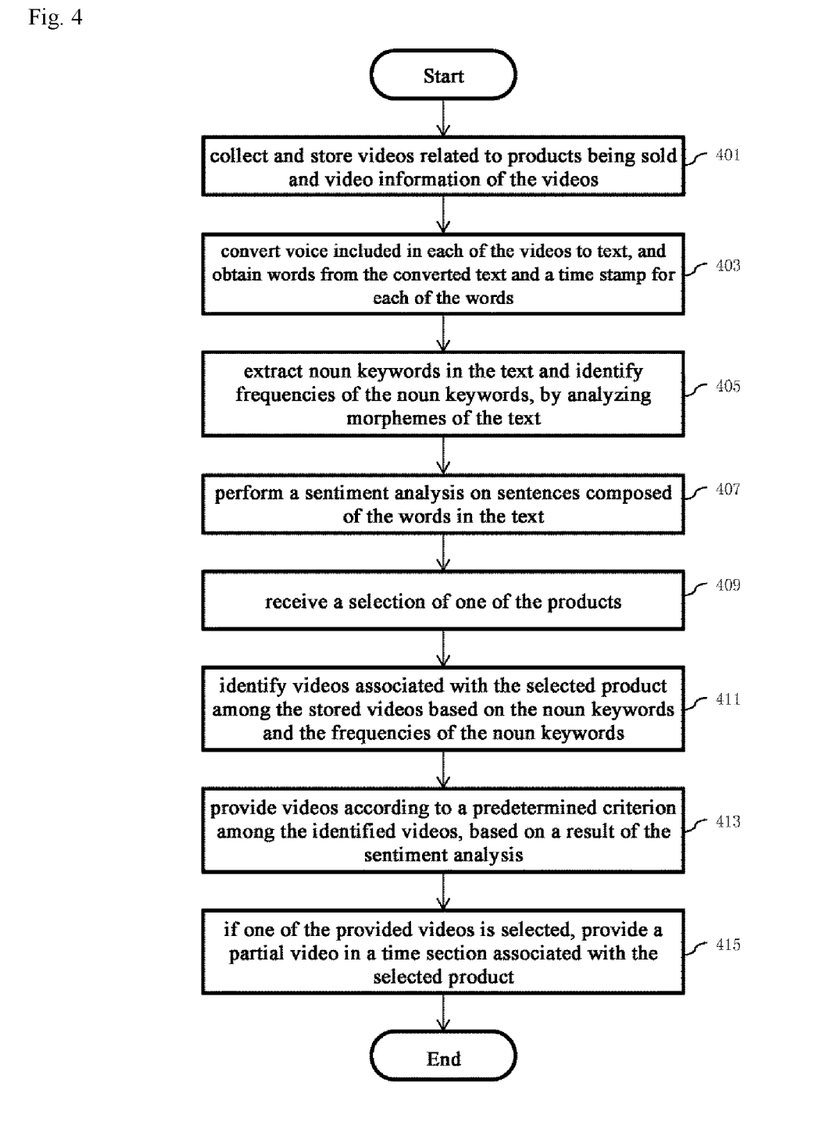
FIG. 4 is a flowchart of video recommendation in a video recommendation system according to some examples.

FIG. 4 is a flowchart of video recommendation in a video recommendation system according to some examples. FIG. 4 shows an example of operation by the video recommendation system 110.

Referring to FIG. 4, a method for recommending a video by a video recommendation system may include the step 401 to the step 415. However, it is not limited thereto, and general-purpose steps other than the steps described in FIG. 4 may be further included in the method of FIG. 4.

The method of FIG. 4 may be configured with steps that are processed in a time series in the video recommendation system 110 or the one or more devices constituting the video recommendation system 110 described above in FIGS. 1 to 3. Accordingly, the matters described in FIGS. 1 to 3 may be equally applied to the method of FIG. 4, even though the matters are not stated below in relation to the method of FIG. 4.

Referring to FIG. 4, in the step 401, the video recommendation system 110 may collect videos related to products being sold and video information of videos and store them in a database of the video recommendation system. The videos related to the products being sold and the video information of the videos may be collected based on at least one of a product name or a name representing one or more characteristics of products. In addition, the video information of the videos may include at least one of the titles of the videos, the numbers of views of the videos, the upload dates of the videos, indications of preferences for the videos, the numbers of subscribers to the channels where the videos were uploaded, the addresses of the videos, or the comments on the videos.

In the step 403, the video recommendation system 110 may convert voice included in each of videos to text and obtain words from the converted text and a time stamp for each of the words. Specifically, the video recommendation system 110 may convert the voice to the text based on STT (speech-to-text). In addition, the video recommendation system 110 may identify words included in the text based on the duration of the voice; and output the identified words and a time stamp for each of the words together. In addition, the time stamps may comprise the start time and duration of each of the words. In addition, the time stamps may comprise accuracy which numerically indicates whether each of the words included in the text was accurately identified. That is, the time stamps may comprise time information such as the start time and duration of each of the words, and further comprise accuracy for each of the words. STT for conversion of voice to text may be performed based on a deep learning training model in the video recommendation system 110. In addition, the deep learning training model may comprise at least one of an acoustic model or a language model.

In the step 405, the video recommendation system 110 may extract noun keywords in the text and identify frequencies of the noun keywords, by analyzing morphemes of the text. Specifically, the video recommendation system 110 may identify whether the extracted noun keywords are the same and count the extracted noun keywords, thereby identifying frequencies of the noun keywords. In addition, the extracted noun keywords may comprise at least one of a product name or a name representing one or more characteristics of products. In addition, the morpheme analysis may be performed in the video recommendation system 110 using a morpheme analyzer which underwent pre-learning based on deep learning.

In the step 407, the video recommendation system 110 may perform a sentiment analysis on sentences composed of the words in the text. Specifically, the video recommendation system 110 may calculate a prediction value for sentiment for each sentence and reliability for the prediction value based on a pre-configured sentiment lexicon. The prediction value may be one of a first value indicating positive sentiment and a second value indicating negative sentiment. In addition, the sentiment lexicon may be updated at a predetermined cycle by the video recommendation system 110. In addition, the sentiment analysis may be performed by the video recommendation system 110 using a sentiment model which pre-learned the sentiment lexicon based on deep learning. In this case, the sentiment model may be configured based on an n-gram or Naive Bayesian categorization model. According to some examples of the present disclosure, the step 407 may be performed after the step 405 is performed or may be performed in parallel with the step 405.

In the step 409, the video recommendation system 110 may receive a selection of one of the products.

In the step 411, the video recommendation system 110 may identify videos associated with the selected product among the stored videos based on the noun keywords and the frequencies of the noun keywords. Specifically, the video recommendation system 110 may identify at least one noun keyword corresponding to the selected product; and determine, among the videos from which at least one noun keyword was extracted, videos where a frequency of the at least one noun keyword satisfies a predetermined criterion.

In the step 413, the video recommendation system 110 may provide videos according to a predetermined criterion among the identified videos, based on a result of the sentiment analysis. Specifically, the video recommendation system 110 may identify, for the identified videos, a prediction value for sentiment for each sentence and reliability for the prediction value; and provide videos which satisfy the predetermined criterion among the identified videos according to priority based on the prediction value and the reliability for the prediction value. In addition, the provided videos may be visually displayed in an order according to the priority.

In the step 415, if one of the provided videos is selected, the video recommendation system 110 may provide a partial video in a time section associated with the selected product. Specifically, video recommendation system 110 may identify a time stamp of a noun keyword corresponding to the selected product based on a result of the STT for the selected video; and provide the partial video whose playback is set to start at a predetermined earlier time than the start time of the playback section corresponding to the time stamp, the start time of playback of the partial video, and a text including the noun keyword.

The method of FIG. 4 described above may be performed by one or more devices each of which comprises a communication unit (for example, communication unit 310), a control unit (a control unit 320), and a storage unit (storage unit 230), and the one or more devices may constitute the video recommendation system 110 as described above in regard to FIG. 3.

Figure 5:
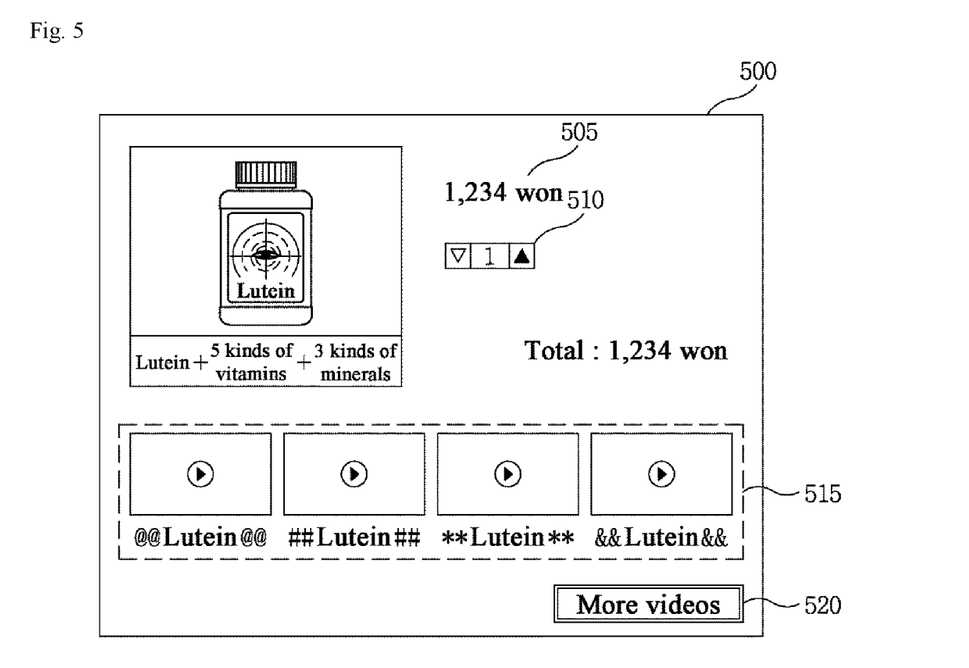
FIG. 5 illustrates an example in which videos related to products are provided in a video recommendation system according to some examples.
Figure 6:
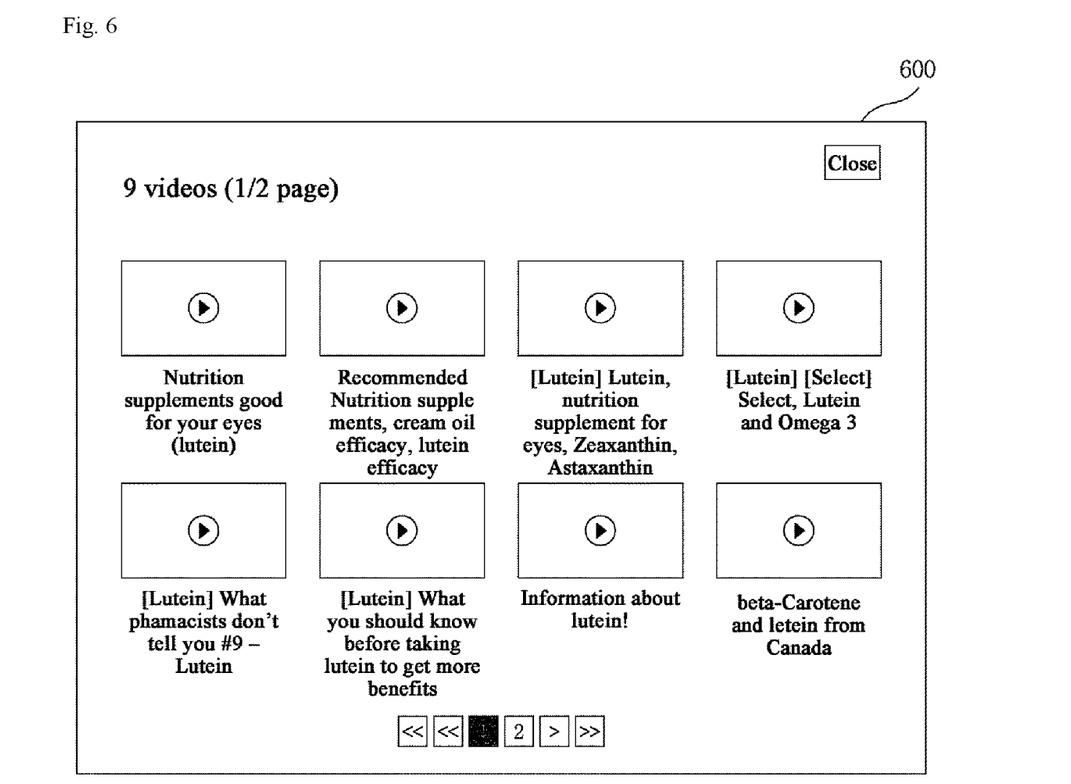
FIG. 6 illustrates an example in which videos related to products are additionally provided in a video recommendation system according to some examples.

FIG. 5 illustrates an example in which videos related to products are provided in a video recommendation system according to some examples. FIG. 6 illustrates an example in which videos related to products are additionally provided in a video recommendation system according to some examples. Specifically, the web pages (500, 600) shown in FIGS. 5 and 6 are results of the step 411 and the step 413 of FIG. 4 and may be understood as web pages provided by the web server 120 which display videos provided by the video recommendation system 110 or the one or more devices constituting the video recommendation system 110 described above. Hereinafter, description is provided about an example where a service about health supplement food sales is provided.

Referring to FIG. 5, a health supplement food selected by the user device 130 may be a product the main ingredient of which is lutein. The video recommendation system 110 may identify videos in the database 240 related to the product name of the selected product or the main ingredient, lutein, and determine videos to be provided according to frequencies of noun keywords and sentiment analysis results. Accordingly, the web server 120 may provide the web page 500 as shown in FIG. 5 to the user device 130. That is, the web server 120 may provide the user device with a screen 515 in which videos provided by the video recommendation system 110 are listed in order below a portion comprising the price of a selected product and an indication in which the number of the product purchased can be selected (505, 510). In addition, when the 'More videos' button 520 is selected in FIG. 5, the web server 120 may provide the user device 130 with the web page 600 additionally displaying videos related to the product name of the selected product and the main ingredient, lutein, as shown in FIG. 6. The videos displayed in FIGS. 5 and 6 as described above are those that show positive sentiment for the product or lutein and allow the user to obtain information about the product or lutein while encouraging the user to purchase the product.

Figure 7:
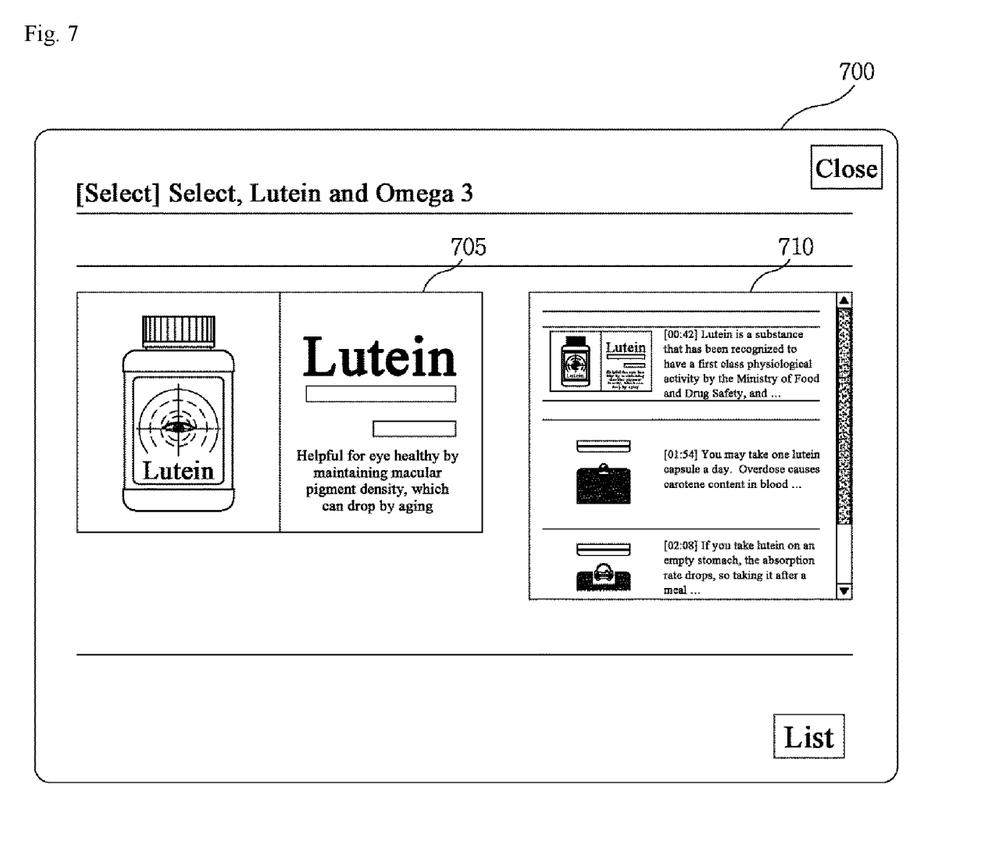
FIG. 7 illustrates an example in which a partial video in a time section related to a product is provided in a video recommendation system according to some examples.

FIG. 7 illustrates an example in which a partial video in a time section related to a product is provided in a video recommendation system according to some examples. Specifically, the web page 700 shown in FIG. 7 is a result of the step 415 of FIG. 4 and may be understood as a web page provided by the web server 120 which displays videos provided by the video recommendation system 110 or the one or more devices constituting the video recommendation system 110 described above. Hereinafter, description is provided about an example where a service about health supplement food sales is provided.

Referring to FIG. 7, among the videos displayed on the web pages (500, 600) of FIGS. 5 and 6, the one video 705 may be selected by the user device 130. When a particular video is selected, the video recommendation system 110 may search a result of STT for the selected video in the database 240, and identify a time stamp for a time or a playback section in which a noun keyword indicating lutein, which is the main ingredient of the selected product, was extracted. The video recommendation system 110 may set the selected video to start at a predetermined earlier time than the identified start time, and provide the web server 120 with information on a partial video for which the start time of playback has been set as described above, the text of the sentence in which the noun keyword is mentioned, and the start time of the playback of the partial video or of the sentence in which the noun keyword is mentioned. Accordingly, the web server 120 may directly provide the user device 130 with the web page 700 comprising the partial video 710 where playback starts at a portion of the selected video in which description of lutein, evaluation, or the like is mentioned, as shown in FIG. 7. By providing a partial video as shown in FIG. 7, contents of the video related to a product that the user is interested in and the components of the product can be identified more promptly and conveniently.

The methods according to the claims or the examples described in the specification of the present disclosure may be implemented in the form of hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs comprise instructions that cause the electronic device to execute the methods according to the claims or the examples described in the specification of the present disclosure.

The programs (software modules and software) may be stored in a random access memory, a non-volatile memory including a flash memory, a read only memory (ROM), an electrically erasable programmable read only memory (EE-PROM), a magnetic disc storage device, a compact disc-ROM (CD-ROM), a digital versatile disc (DVD) or another form of optical storage device, or a magnetic cassette. Or, they may be stored in a memory consisting of a combination of some or all of them. In addition, a plurality of each memory type constituting the combination may be included.

Additionally, the programs may be stored in an attachable storage device that can be accessed via a communication network such as the Internet, an intranet, a local area network (LAN), a wide area network (WAN), or a storage area network (SAN), or a combination thereof. Such a storage device may be connected to a device performing an example of the present disclosure through an external port. In addition, a separate storage device in a communication network may access a device performing an example of the present disclosure.

In the specific examples of the present disclosure described above, constituents included in the disclosure are expressed in the singular or plural form depending on the specific examples presented. However, the singular or plural expressions are selected properly for the situation presented for convenience of explanation, and the present disclosure is not limited to the singular or plural constituents. Even when a constituent is expressed in the plural form, one of it may be implemented, and even when a constituent is expressed in the singular form, a plurality of it may be implemented.

Meanwhile, although specific examples are described in the detailed description of the present disclosure, various modifications of them are obviously possible without departing from the scope of the present disclosure. Therefore, the scope of the present disclosure should not be limited to the examples described, but should be determined not only by the scope of the claims described below but also equivalents of the claims.

DESCRIPTION OF REFERENCE NUMERALS

100: service provision system
110: video recommendation system
120: web server
130: user device
210: video collection unit
220: video data manipulation unit
230: video recommendation unit
240: database
300: electronic device
310: communication unit
320: control unit
330: storage unit

The invention claimed is:

1. A method for recommending a video by a video recommendation system, comprising:
  by a video collection unit of the video recommendation system, collecting and storing in a database of the video recommendation system videos related to products being sold and video information of the videos, wherein the videos related to the products being sold and the video information of the videos are collected based on at least one of a product name or a name representing one or more characteristics of products;
  by a video data manipulation unit of the video recommendation system, converting voice included in each of the videos to text;
  by the video data manipulation unit, obtaining words from the converted text and a time stamp for each of the words;
  by the video data manipulation unit, extracting noun keywords in the text and identifying frequencies of the noun keywords, by analyzing morphemes of the text using a morpheme analyzer performing pre-learning based on deep learning;
  by the video data manipulation unit, performing a sentiment analysis on sentences composed of the words in the text;
  by a video recommendation unit of the video recommendation system, receiving a selection of one of the products;
  by the video recommendation unit, identifying videos associated with the selected product from among the videos stored in the database based on the noun keywords and the frequencies of the noun keywords;
  by the video recommendation unit, providing videos according to a predetermined criterion among the identified videos, based on a result of the sentiment analysis; and
  if one of the provided videos is selected, by the video recommendation unit, providing a partial video in a time section associated with the selected product.

2. The method for recommending a video according to claim 1,
  wherein the video information of the videos comprises at least one of:
  the titles of the videos, the numbers of views of the videos, the upload dates of the videos, indications of preferences for the videos, the numbers of subscribers to the channels where the videos were uploaded, the addresses of the videos, or the comments on the videos.

3. The method for recommending a video according to claim 1,
  wherein converting voice included in each of the videos to text by the video data manipulation unit comprises converting the voice to the text based on STT (speech-to-text) being performed based on a deep learning training model, the deep learning training model comprising at least one of an acoustic model or a language model;
  wherein obtaining time stamps by the video data manipulation unit comprises identifying words included in the text based on the duration of the voice and outputting the identified words and a time stamp for each of the words together; and
  wherein the time stamps comprises the start time, duration of each of the words, and accuracy which numerically indicates whether each of the words included in the text was accurately identified.

4. The method for recommending a video according to claim 1,
  wherein extracting noun keywords in the text and identifying frequencies of the noun keywords by the video data manipulation unit comprises identifying whether the extracted noun keywords are the same and counting the extracted noun keywords, thereby identifying frequencies of the noun keywords, wherein the extracted noun keywords comprises at least one of a product name or a name representing one or more characteristics of products.

5. The method for recommending a video according to claim 1,
  wherein performing a sentiment analysis on sentences by the video data manipulation unit comprises calculating a prediction value for sentiment for each sentence and reliability for the prediction value based on a preconfigured sentiment lexicon being updated at a predetermined cycle, the prediction value being one of a first value indicating positive sentiment and a second value indicating negative sentiment.

6. The method for recommending a video according to claim 5,
  wherein the sentiment analysis is performed using a sentiment model which pre-learned the sentiment lexicon based on deep learning, the sentiment model being configured based on an n-gram or Naive Bayesian categorization model.

7. The method for recommending a video according to claim 1,
  wherein identifying, by the video recommendation unit, videos associated with the selected product among the videos stored in the database based on the noun keywords and the frequencies of the noun keywords comprises:
  identifying at least one noun keyword corresponding to the selected product; and
  determining, from the videos from which at least one noun keyword was extracted, videos where a frequency of the at least one noun keyword satisfies a predetermined criterion.

8. The method for recommending a video according to claim 1,
wherein providing, by the video recommendation unit, videos according to a predetermined criterion among the identified videos, based on a result of the sentiment analysis comprises:
identifying, for the identified videos, a prediction value for sentiment for each sentence and reliability for the prediction value; and
providing videos which satisfy the predetermined criterion among the identified videos according to priority based on the prediction value and the reliability for the prediction value.

9. The method for recommending a video according to claim 8,
wherein the provided videos are visually displayed in an order according to the priority.

10. The method for recommending a video according to claim 9,
wherein providing, if one of the provided videos is selected, a partial video in a time section associated with the selected product by the video recommendation unit comprises:
identifying a time stamp of a noun keyword corresponding to the selected product based on a result of the STT for the selected video; and
providing the partial video whose playback is set to start at a predetermined earlier time than the start time of the playback section corresponding to the time stamp, the start time of playback of the partial video, and a text including the noun keyword.

11. A system for recommending a video, comprising:
a video collection unit;
a video data manipulation unit;
a video recommendation unit; and
a database storing data processed by the video collection unit and the video data manipulation unit,
wherein the video collection unit collects and stores in the database videos related to products being sold and video information of the videos, wherein the videos related to the products being sold and the video information of the videos are collected based on at least one of a product name or a name representing one or more characteristics of products;
wherein the video data manipulation unit
converts voice included in each of the videos to text,
obtains words from the converted text and a time stamp for each of the words,
extracts noun keywords in the text and identifies frequencies of the noun keywords, by analyzing morphemes of the text using a morpheme analyzer performing pre-learning based on deep learning, and
performs a sentiment analysis on sentences composed of the words in the text, and
wherein the video recommendation unit
receives a selection of one of the products,
identifies videos associated with the selected product from among the videos stored in the database based on the noun keywords and the frequencies of the noun keywords,
provides videos according to a predetermined criterion among the identified videos, based on a result of the sentiment analysis, and
if one of the provided videos is selected, provides a partial video in a time section associated with the selected product.

12. The system for recommending a video according to claim 11,
wherein the video information of the videos comprises at least one of:
the titles of the videos, the numbers of views of the videos, the upload dates of the videos, indications of preferences for the videos, the numbers of subscribers to the channels where the videos were uploaded, the addresses of the videos, or the comments on the videos.

13. The system for recommending a video according to claim 11,
wherein the video data manipulation unit further converts the voice to the text based on STT (speech-to-text) being performed based on a deep learning training model, the deep learning training model comprising at least one of an acoustic model or a language model,
identifies words included in the text based on the duration of the voice; and
outputs the identified words and a time stamp for each of the words together, and
wherein the time stamps comprise the start time, duration of each of the words, and accuracy which numerically indicates whether each of the words included in the text was accurately identified.

14. The system for recommending a video according to claim 11,
wherein the video data manipulation unit further identifies whether the extracted noun keywords are the same and counts the extracted noun keywords, thereby identifying frequencies of the noun keywords, and
wherein the extracted noun keywords comprise at least one of a product name or a name representing one or more characteristics of products.

15. The system for recommending a video according to claim 11,
wherein the video data manipulation unit further calculates a prediction value for sentiment for each sentence and reliability for the prediction value based on a pre-configured sentiment lexicon being updated at a predetermined cycle, the prediction value being one of a first value indicating positive sentiment and a second value indicating negative sentiment.

16. The system for recommending a video according to claim 15,
wherein the sentiment analysis is performed using a sentiment model which pre-learned the sentiment lexicon based on deep learning, the sentiment model being configured based on an n-gram or Naive Bayesian categorization model.

17. The system for recommending a video according to claim 11,
wherein the video recommendation unit further
identifies at least one noun keyword corresponding to the selected product, and
determines, among the videos from which at least one noun keyword was extracted, videos where a frequency of the at least one noun keyword satisfies a predetermined criterion.

18. The system for recommending a video according to claim 11,
wherein the video recommendation unit further
identifies, for the identified videos, a prediction value for sentiment for each sentence and reliability for the prediction value; and provides videos which satisfy the predetermined criterion among the identified videos according to priority based on the prediction value and the reliability for the prediction value.

19. The system for recommending a video according to claim 18,
wherein the provided videos are visually displayed in an order according to the priority.

20. The system for recommending a video according to claim 19,
wherein the video recommendation unit further
identifies a time stamp of a noun keyword corresponding to the selected product based on a result of the STT for the selected video, and
provides the partial video whose playback is set to start at a predetermined earlier time than the start time of the playback section corresponding to the time stamp, the start time of playback of the partial video, and a text including the noun keyword.

\* \* \* \* \*